Patented Aug. 25, 1942

2,294,238

UNITED STATES PATENT OFFICE 2,294,238

INSECTICIDAL COMPOSITION

Donald F. Murphy, Langhorne, Pa., assignor to Röhm & Haas Company, Philadelphia, Pa.

No Drawing. Application April 28, 1939,
Serial No. 270,511

12 Claims. (Cl. 167—43)

This invention relates to improved oil sprays for controlling plant pests. It deals particularly with aqueous sprays which contain oil and small, suitable amounts of an organic thiocyano compound and which are effective in killing insects and other plant pests without undue damage to the host plant and without danger to human beings. It also deals with liquids applied as so called "vapors." It relates further to compositions ready for use, comprising oil, thiocyano compound, blending agent, and spreading and emulsifying agent.

While the use of petroleum oils in insecticidal sprays has aided in the control of such pests as scale insects, codling moth, aphids, spiders, pear psylla, etc., there has frequently been damage to the host, whether plant or tree, as shown by curling, wilting, or drooping of leaves, necrotic burning, spotting or yellowing of foliage, loss of foliage, spotting and dropping of fruit, killing of buds or twigs, or other undesirable result. In some cases where no immediate damage was noted, there has been a cumulative effect from repeated oil sprayings, even over a period of years, which decreased productivity or under some conditions resulted in the loss of plants. It has been proposed to lessen the damage by use of highly purified oils. These oils, of high unsulfonatable residue, although usually less harmful to the host plant, were found less effective and required higher percentages of oil to be of value. Thus, the advantage of these oils is offset in large part because the increased quantities of oils give difficulties of a physical nature. In dormant or delayed dormant sprays a high concentration of oil interferes with respiration and metabolism; in summer applications even light oils at effective concentrations may cause troubles which are believed to be due to changes in respiration, transpiration and photo-synthesis. It is further generally agreed that oils must be applied only under favorable conditions and that oils must not be applied when it is too hot or too cold, when dew or fog are present, or when wind velocities are appreciable.

Until now the addition of various toxic substances, such as rotenone, to oil sprays has not corrected these difficulties. In particular, they have not permitted sufficient reduction of oil to make oils safe and at the same time effective. Furthermore, insecticidal compositions containing natural toxicants, such as nicotine, derris, pyrethrins, etc., and even synthetic toxicants, are prone to suffer changes during storage, as shown by darkening, formation of sludge, and loss of toxicity. The oil-thiocyanate combinations are stable indefinitely during storage when compounded correctly. Oil sprays containing natural toxicants or many synthetic agents, such as the nitrophenols, are unstable when exposed on foliage after spraying. Under the influence of light and air they lose their potency and are no longer effective against insects and may cause damage to plants. The oil-thiocyanate combinations remain effective for long periods of time and do not yield toxic decomposition products with light and air.

Addition of a thickening agent to an oil to decrease penetration has not eliminated the damage caused by the oil or made the oil more toxic to parasites. Yet it is generally recognized that oils would be more widely useful, economical, and effective if some of the difficulties inherent thus far in their use could be overcome.

It is an object of this invention to provide compositions and sprays containing oil which, when properly applied to plants, are practically non-phytocidal yet are effective in killing plant pests. It is an object of this invention to make possible the full utilization of oils for the protection of plants. It is also an object of this invention to provide parasiticidal compositions which are non-toxic to domestic animals and human beings. It is another object to provide an oil spray which is effective against various types of plant parasites so that one application of the spray gives a greater economic return. Other objects will be apparent from the description of the invention which follows.

It has been found that the amount of oil which is required to combat pests can be made so low that no injury results to plants which tolerate oil, if the oil is mixed with a thiocyano compound of insecticidal value. It has also been found that the value of oil-thiocyanate mixtures is enhanced by the presence of a third component which acts as a mutual solvent or blending agent. The combination of thiocyanate and oil or combination of thiocyanate, oil, and other materials may be prepared while an aqueous spray is being mixed or these materials may be compounded in the form of a product which is ready for use and requires merely addition of water with stirring to give an emulsion suitable for spray purposes.

The addition of an organic thiocyano compound of insecticidal activity to the oil, it is now found, effectively lowers the interfacial tension of the oil against water. For example, the addition of one part butoxyethoxyethyl thiocyanate in twenty-four parts of pure, white petroleum spray oil lowers the interfacial tension between oil and water by over thirty dynes per centimeter. The lowering of interfacial tension is due, without doubt, to the fact that the molecules of insecticidally active thiocyanate become oriented, possessing a hydrocarbon group and a polar group in the thiocyanate radical. Because of the lowering of the boundary tension, oil with a thiocyanate disperses readily in water, when the system is agitated, to give a relatively unstable emulsion, which is unusually effective in the deposition of oil on foliage and plant pests. In this way the thiocyano compound acts on the oil and activates it, while the oil carries and spreads the thiocyanate.

The use of a blending agent with the oil-thiocyanate combination has been found of particular value in increasing the potency of the spray. In the case of certain thiocyanates the blending agent ensures a homogeneous solution of oil and thiocyanate. Without such an agent many spray oils and thiocyano compounds will separate even though the compounds may be sufficiently miscible with naphtha and other light petroleum distillates. Such separation may overcome the desirable results which have been obtained with the oil-thiocyanate combination. These agents, further, seem to impart to some degree both oil- and water-solubility to the thiocyanate. In this way the thiocyanate may become effective against both oil systems and water systems. Thus, plant pests, whether possessing hydrophobic or hydrophylic properties, may be attacked by the oil-thiocyanate sprays. Suitable blending agents include organic halides, higher alcohols, glycols, and ketones, and their derivatives which still contain a polar group, such as esters, ethers, and halides. An economical and potent agent is pine oil which contains a high percentage of terpineols as well as cyclic hydrocarbons. Typical examples of blending agents by which thiocyanates may be solubilized in oils and activated in sprays include, as alcohols, amyl alcohol, terpineol, benzyl alcohol, di-isobutyl phenol, cyclohexanol; as ketones, methyl hexyl ketone, diacetone alcohol, acetophenone, the isophorones, cyclohexanone, etc.; as esters, butyl lactate, diglycol laurate, ethylene glycol diacetate, methoxy ethyl acetate, hydroxyethoxyethyl acetate, methyl salicylate, phenyl acetate, diethyltartrate, etc.; as halides, ethylene dichloride, amylene dichloride, tetrachloroethane, $\beta,\beta'$-dichlorodiethyl ether, etc.; as ethers, diamyl ether, various glycol ethers, phenyl amyl ether, etc.; mixtures of compounds, particularly as found in natural products, with cyclic hydrocarbons, or with such alicyclic compounds as cyclohexane, tetrahydro- or decahydro-naphthalene, etc.

On most types of foliage and for most pests it becomes desirable to increase the wetting, spreading, and emulsifying capacity of the oil-thiocyanate mixture. This may be accomplished with a surface-active material which lowers the surface tension of the water, such as a petroleum sulfonate, the condensates of polyglycerol with monobasic, non-drying aliphatic acids, and a smaller amount of a resin-forming dicarboxylic acid as described in application Serial No. 259,317 filed March 2, 1939, by H. A. Bruson, now U. S. Patent No. 2,204,009 issued June 11, 1940, the condensation products of fatty alcohols or fatty acids with alkylene oxides, polyglycerol-fatty acid condensates, sulfonated vegetable oils, casein, quaternary ammonium salts, or other suitable surface-active agents. If a homogeneous mixture of oil, thiocyano compound, blending agent, and emulsifying agent is desired, the latter agent must, of course, be soluble in the mixture or miscible therewith to the necessary extent.

For optimum results it is necessary to use either a low concentration of a highly active wetting agent or a moderate amount of a less powerful agent. Too powerful a wetting agent in any appreciable quantity or too much of a wetting agent promotes "drain off" and prevents deposition of oil from the combination described here. Also, these agents help to determine the nature of the emulsion in the spray. It has been established that rather unstable, quick-breaking emulsions are the most effective for most applications. Yet the emulsion must have sufficient stability to remain uniform in the spray tank. The particular materials used in this invention combine to give an emulsion of the most useful type and by proper choice of concentrations of blending agent and wetting-emulsifying agent almost any required degree of wetting and of stability of emulsion can be obtained.

In general the aqueous sprays which have been found most effective on citrus, ornamentals, and deciduous plants and trees, which are not over-sensitive to oils, contain one part of a thiocyano compound in 400 to 4000 parts of spray together with ⅛ to 2% of an oil. It is seldom necessary to use a higher concentration of thiocyano compound, although for certain unusual applications a higher oil concentration, such as 5%, is advisable and allowable. When auxiliary agents are added, they are generally used at roughly the same concentration as the thiocyano compound. A typical horticultural spray may contain one part in 400 or more of a blending agent or one part in 400 or more of a spreading and emulsifying agent. Preferred sprays contain about 0.25 to 1.25 part per thousand of a thiocyanate, about 0.25 to 2.50 parts per thousand of a blending agent such as pine oil, about 0.25 to 1.25 parts per thousand of a spreading-emulsifying agent such as the polyglycerol-fatty acid-resin acid condensates or other such agents mentioned already, and 5 to 10 parts of petroleum spray oil. Only exceptional circumstances make high oil concentrations necessary in the ordinary spray although they are usual in so-called "vapo" or "vapor" sprays. But even in the latter sprays the ratio of thiocyanate to oil will remain approximately the same as for conventional sprays.

It has been found that the usual horticultural spray may often be replaced with "vapor" sprays or modified "vapor" sprays, usually with advantages in control and cost. In "vapor" spraying anhydrous or concentrated aqueous mixtures are finely atomized and applied as a mist or fog to plants. The oil-thiocyanate combinations lend themselves particularly well to this type of application. Instead of the 100 to 400 gallons of aqueous spray per acre required in the usual method of application, there may be used in "vapor" spraying only 3 to 10 gallons per acre. For example, an aqueous spray containing 7.5% of 70 viscosity oil, 0.61% of butyloxyethoxyethyl thiocyanate, 1.25% of pine oil, and 0.61% of sulfonated petroleum gave complete control of leaf hoppers on grapes when applied at the rate of 8–10 gallons per acre.

The ordinary spray oils which are commercially available are petroleum distillates free from heavy ends and having viscosities between 50 to 130 seconds at 100° F. Most of the commercial petroleum oils have an unsulfonatable residue greater than 60%. Under the conditions encountered in this invention, the exact nature of the oils which may be used is less critical as to viscosity, unsulfonatable residue, volatility, etc. than has been the case in the past and any good grade of spray oil may be used. The preferred petroleum oils possess an unsulfonatable residue of at least 60% and a viscosity between about 60 and 100 seconds Saybolt at 100° F. By proper choice of grade of petroleum oil, sprays may be adapted to dormant, delayed dormant, or summer use. Spray oils are to be distinguished from gasolenes and light naphthas which are used as carriers and diluents in fly sprays and in other sprays. Such light fractions have not been found particularly effective in the tests here reported.

Related to petroleum oils are the tar oils, which, as another type of spray oil, are used in dormant sprays with good results against aphis eggs and eggs of European red mite, but which are poor by themselves for control of scale insects or against bud moth eggs, etc. The addition of thiocyanate to tar oils increases the effectiveness of tar oils in combating any of these pests. For severe infestations of bud moth, scurfy scale, oyster shell scale, and eggs of rosy aphis such high concentrations of tar oil are ordinarily required that the sprays may be unsafe for the plant, at least 5 to 6 parts of oil per 100 parts of spray being necessary. The addition of a small amount of thiocyanate lowers the effective concentration of tar oil to within the limits of safe application.

A mixture of tar oil, petroleum oil, and thiocyanate provides unusually powerful dormant sprays, effective against many different plant pests.

It is also possible to replace some or all of the mineral oil in some cases with a glyceride of a fatty acid, such as cottonseed oil, soya bean oil, rape seed oil, fish oils, etc. Under certain conditions these natural oils appear to have definite insecticidal or fungicidal value or both which is enhanced in the thiocyanate combination. The fixed oils, as still another type of spray oil, are better tolerated by less hardy plants than mineral oils. In addition to being parasiticidally active, these oils act as carriers for the thiocyanate.

The thiocyanates which may be used include aliphatic, alicyclic and aromatic thiocyano compounds of many types. These compounds contain one or more thiocyano or isothiocyano groups. They include esters of thiocyanic acid such as amyl, dodecyl, or benzyl thiocyanate, esters of mono or polycarboxylic acids containing the active group in the alcohol residue such as the β-thiocyano ethyl alcohol ester of lauric acid, or in the acid radical such as the ethyl ester of β-thiocyanopropionic acid, dithiocyano compounds, such as dithiocyano styrene, acetals such as bis-(γ-thiocyanopropoxy)-methane, ethers, such as β-thiocyano-β'-butoxydiethyl ether, aromatic compounds such as p-thiocyano toluidene, thiocyano-α-naphthol, ketones such as α,γ-dithiocyano-propanone-2, etc. Other useful thiocyanates are typified by dithiocyano ethyl ether, dithiocyano ethyl sulfoxide, and dithiocyano ethyl amine. While in most of the experimental work reported here butoxyethoxyethyl thiocyanate has been uniformly used to illustrate the effect of an organic thiocyanate, any of the organic thiocyano compounds may be similarly applied with comparable results.

A mixture was prepared from 1 part of butoxyethoxyethyl thiocyanate, 2 parts of pine oil, 1 part of an insecticide-emulsifier made from 200 parts of cocoanut fatty acids, 100 parts of polyglycerol and 20 parts of phthalic anhydride. The thiocyanate, pine oil, and insecticide-emulsifier were mixed with 12 parts of a mineral oil having an unsulfonatable residue of 82–84 and a viscosity of 65 seconds Saybolt at 100° F. A spray was prepared by mixing 2 quarts of this mixture in 50 gallons of water. This spray was applied to ash trees, about 65 feet high, infested with oyster shell scale, resulting in a kill of 75%; to Euonymus, about 6 feet high, infested abundantly with euonymus scale, with perfect control of the infestation; to lilacs, about 6 feet high, abundantly infested with oyster shell scale, with very satisfactory control; to magnolia and tulip trees, infested with tulip scale, with satisfactory control; etc. In all cases control was accomplished without injury to the host. The work done with ornamentals, both evergreen and deciduous, has shown that the oil-thiocyanate sprays will control many types of scales, destroy aphids, spiders, mites, etc. and act as an ovicide for eggs of such pests as rosy apple aphis and European red mites, which are not susceptible to oil or thiocyanate alone, particularly at the concentrations used in these sprays.

A spray of the same composition as shown above was used at dilutions of 1:100 to 1:300 against mealy bugs in greenhouses with highly favorable results.

In the control of Mediterranean fig scale on Kadota and Calimyrna fig trees it was found that the oil-thiocyanate sprays gave positive control whereas oil alone or oil with lime sulfur did not. In an orchard where the infestation averaged 117 scale per leaf, the use of a spray containing 8% oil reduced the average count to 17.5 scale per leaf after the second hatch, while a spray containing butoxyethoxyethyl thiocyanate at 1:800, pine oil at 1:400, sulfonated petroleum at 1:800, and oil at 3% gave a kill which left only 4.7 scale per leaf after the second hatch. With oil at 4%, thiocyanate at 1:1200, pine oil at 1:1200 and emulsifier at 1:2400, the count was still better, being 1.2 per leaf. Experiments over a three year period showed scale control without damage to the fig trees. According to the prior practices it had been necessary to apply a heavy oil spray during the dormant season and, in the case of heavy infestation, a light, summer oil spray to approach control of this scale. The result was injury to both tree and fruit with an economic loss due to the drop of fruit following the light oil spray. Lime-sulfur may be combined with the oil-thiocyanate spray if so desired.

Control of scale on citrus has presented a difficult problem for adequate control without injury to the host. By the use of oil alone, as commonly practiced, fair control of black scale is obtained with oil at 1.5 to 2% in quick-breaking emulsions. To obtain commercial control, however, it is necessary to alternate or supplement oil sprays with hydrocyanic acid gas fumigation. The required concentrations produce considerable injury, permit only one spraying per year in dry climates, and show cumulative effects in that branches die-back from oil injury. At full concentrations oils give poor kills in resistant areas. They cause drop of fruit and, applied to ripe fruit, influence color and taste seriously. When the concentration of oil is reduced, results are unsatisfactory. Thus, oils at 0.5% leave 12 to 20% alive in a black scale infestation on orange trees. Under the same general conditions the addition of butoxyethoxyethyl thiocyanate together with blending agent and emulsifier in the ratio of 1:2:1 gave the following results—

TABLE I

*Percent of black scale alive with oil at ½%*

| Grade of oil | RSCN in parts per thousand | | |
|---|---|---|---|
| | .625 ppt. | .416 ppt. | .313 ppt. |
| | Per cent | Per cent | Per cent |
| #2 | 0.03 | 0.17 | 0.56 |
| #3 | 0.04 | 0.16 | 0.21 |

In another series of experiments orange trees were sprayed with oils at different concentrations and with a constant concentration of thiocyanate.

TABLE II

*Percent of black scale alive with RSCN at 0.313 part per thousand*

| Concentration of #2 oil | ½% | ¾% | 1% |
|---|---|---|---|
| A | 0.14 | 0.19 | 0.08 |
| B | 0.50 | 0.09 | 0.08 |

(A contained pine oil as a blending agent at 1:1600, B at 1:3200)

Comparisons were made with various commercially recommended combinations. Thus, an emulsifiable oil at ⅔% plus derris at 1 lb. per 100 gallons of spray left scale showing a count of 2.9 alive per unit, a showing considered poor. An oil-thiocyanate mixture used so as to yield $^9/_{16}$% of oil, thiocyanate at 0.625 part per thousand left 1.26 alive per unit and, when a polyglycerollauric acid-phthalic acid condensate replaced the sulfonated petroleum, 1.05 alive per unit, showings considered satisfactory.

Grapefruit trees were sprayed for a mealy bug infestation. With an emulsifiable oil at 2%, a kill of about 45% was obtained. Addition of butoxyethoxyethyl thiocyanate at 1:2000 raised the kill to 93%. Such a low concentration of thiocyanate by itself would not be helpful. Unsprayed controlls showed no decrease in count. The particularly significant feature of this application was the increase in "clean" fruit from 45% to 73% and a 50% decrease in fruit dropped when the thiocyanate was used in conjunction with the oil.

Mealy bugs on coleus were sprayed with various combinations of materials at dilutions of 1:300. Spray No. 1 contained a well dispersed, 65 viscosity petroleum oil; Spray No. 2 was a mixture of 85% of 65 viscosity petroleum oil and 15% of insecticide-emulsifier made by reacting polyglycerol, cocoanut fatty acids, and a small amount of phthalic anhydride. Spray No. 3 contained 23% of butoxyethoxyethyl thiocyanate, 23% of a petroleum oil of 35 viscosity and 65% of a 65 viscosity petroleum oil. Spray No. 4 contained 23% of butoxyethoxyethyl thiocyanate, 15% of the same emulsifier as used in the second spray, 23% of a 35 viscosity oil, and 39% of a 65 viscosity oil. Spray No. 5 contained 23% of 35 viscosity petroleum oil and 27% of 65 viscosity petroleum oil. Spray No. 6 contained 23% butoxyethoxyethyl thiocyanate, 15% of the emulsifier, used above, 25% of pine oil, 23% of 35 viscosity petroleum oil, and 14% of 65 viscosity oil. Spray No. 7 contained 23% of butoxyethoxyethyl thiocyanate, 15% of emulsifier used above, 39% of pine oil, and 23% of 35 viscosity petroleum oil. All tests were made in triplicate and average values taken. The same lots of thiocyanate, pine oil, emulsifier, and petroleum oils were used in all tests.

Results were as follows—

| Spray | Dilution | Kill | Injury |
|---|---|---|---|
| No. 1 | 1:300 | 18 | None |
| No. 2 | 1:300 | 27 | None |
| No. 3 | 1:300 | 95 | None |
| No. 4 | 1:300 | 89 | None |
| No. 5 | 1:300 | 81 | None |
| No. 6 | 1:300 | 86 | None |
| No. 7 | 1:300 | 94 | None |

The importance of the various factors which have been discussed above is shown here.

Favorable results were obtained against snow scale on Florida orange trees. A standard oil spray reduced the count to 67 live scale per unit. A spray containing oil at ⅔%, butoxyethoxyethyl thiocyanate at 1:4000 with similar concentrations of blending agent and emulsifier left only 37 alive per unit.

Against red scale on lemon trees the addition of a suitable thiocyanate gave a most effective spray as compared to other toxics. Oil alone left a high percentage alive. Derris at 1 lb. per 100 gals. left 40% alive; ¾% oil with derris at ½ lb. per 100 gals. left 35% alive; ¾% oil with butoxyethoxyethyl thiocyanate at 1:3200 left only 20% alive. A great difficulty in the past in combating red scale has resulted from the fact that black scale and red scale cannot be attacked at the same time. If previously available oil sprays were used against black scale, a second application against red scale was not feasible because of injury. But, even at the best, oil alone has not controlled red scale in an entirely satisfactory manner.

The spraying of apple trees with winter oils for the control of rosy apple aphis requires ordinarily a commercial oil at 4% for good control (90–98% kill of eggs). Sprays with the same oil at ½% give no control of these aphids. The same is true for the eggs of European red mite. Oils are also used in dormant or delayed dormant sprays for control of scales, such as San José scurfy, and oyster shell, etc. for control of bud moth, leaf rollers, etc. Such pests are present at the time of spraying in the larvae, pupa, nymph or egg forms. Frequently, heavy oil sprays are not sufficiently effective and, if used, cause winter injury. Either undesirable effect is overcome when lower quantities of oils are used with a thiocyanate. Oil at ½ to ¾% and butoxyethoxyethyl thiocyanate at 0.063%, together with 0.063% of polyglycerol-cottonseed oil fatty acid emulsifier and 0.125% pine oil, gave a kill of 92–95% of the eggs of the rosy apple aphis in a series of field tests in late dormant sprays. In another set of experiments on apple trees a commercial summer oil spray was used and results judged on the basis of the number of spurs free from aphids. When nicotine was added to the oil at 1:800 the spurs free from infestation constituted 8% (average), while with butoxyethoxyethyl thiocyanate at 1:1600, as high as 17.5% of the spurs per tree were free, with an average of 15%, practically twice that found with oil-nicotine sprays. This is of particular interest, as nicotine is highly specific for, and particularly effective against, aphis.

A series of tests was made with the β-thiocyano ethyl ester of higher fatty acids obtained from a commercial cut of cocoanut fatty acids which contained on the average twelve to fourteen carbon atoms. One composition was made with 23% of the above ester, 23% petroleum oil, 15% emulsifier and 39% pine oil. At dilutions of 1 to 400 and 1:600 kills of 97% and 90% respectively, were obtained with green chrysanthemum aphis. A comparable composition in which the thiocyano ester was replaced by β-butoxy-β'-thiocyano diethyl ether gave kills of 97% and 88% respectively. These two preparations were used on aphis rumicis on ageratum with resulting kills of 83% and 70% respectively, at a dilution of 1 to 400. The cocoanut oil ester preparation was used against red spider on ageratum with a kill of 93% at a dilution of 1:300 and a kill of 99% at 1:400.

The thiocyano ethyl ester of fatty acids was also used to the extent of 12% along with 20% of a five percent derris extract, 25% emulsifier, 23% pine oil, and 20% petroleum spray oil. At a dilution of the preparation of 1:400 kills of red spiders on roses were exceptionally high (approaching 100%) although the individual ingredients would have been ineffective at the concentrations used or at individual concentrations comparable to the total concentration of the preparation.

Fruit trees were sprayed with an emulsion containing three-quarters percent petroleum oil and 0.058% of the above ester together with 0.04% emulsifier and 0.1% pine oil, as a dormant spray. Careful counts showed that 98.5% of the aphis eggs were dead. A control plot sprayed with commercial oil emulsions at 5% showed an 89% kill of aphis eggs.

The significant features of all these sprays and preparations are the relatively low concentrations of toxicant and oil required for control of parasites and the resulting safety to the host plant.

Favorable results have been obtained against bud moth, thrips, leaf rollers, leaf hoppers, codling moth, spiders, mealy bugs, white fly, aphis, mites, black scale, snow scale, yellow scale, citricola, hemispherical scale, etc. Yields of fruit have been increased, better fruit has resulted, less fruit has been dropped. Injury from oil has been reduced to a minimum and by substitution of oil sprays for sulfur made possible by the oil-thiocyanate combination, injury due to sulfur has been eliminated. Since the amount of oil used in a spray can be reduced, it now becomes possible to use more than one oil spray per year in critical climates. The new oil sprays can be used in conjunction with other methods of treatment such as fumigation. They may be combined with other insecticidal or fungicidal agents in the same spray. The oil sprays can now be used later in the season than has heretofore been possible. Thiocyanates may be used in dormant, delayed dormant, and summer oil sprays and in vapor sprays. The new oil sprays are effective against a wider variety of pests than were previously attacked by oil sprays. They give less run-off and drain-off. Trees and fruit are cleaner and not discolored. Fruit is more readily freed from spray residues and oil-thiocyanate combinations are not poisonous to human beings or higher animals. Lack of discoloration is of particular value in the case of ornamentals where the discoloration is objectionable. When oil-thiocyanate sprays are used in parks, cemeteries, or other places where there are sun dials, fences, stones, statutes, urns, and the like, there is no disfiguration from spray accidentally falling on these objects. When oil is used in the moderate amounts which become effective by this invention, it has been found that wind-burn is reduced. The use of thiocyanates alone seems to accelerate wind-burn at times but the presence of oil in proper amounts controls transpiration and excess loss of moisture. Water-rot is reduced in citrus fruits.

It has been observed that plants sprayed with the new oil sprays are more successfully transplanted, apparently because over-rapid loss of moisture is prevented. Tomato plants, sprayed for aphis under temperatures rising to 103° F. (shade temperature), wilted less than unsprayed plants. The same mechanism may be responsible, at least in part, for the increased safety obtained in spraying citrus trees in dry climates with the oil-thiocyanate spray as compared to spray containing oil or thiocyanate alone.

The oil, whether mineral, tar, animal or vegetable or a mixture thereof, seems to act as a carrier and sticker for the thiocyanates. At the same time oil becomes extraordinarily effective on its own account. The oil-thiocyanate combination does not suffer from the disadvantages encountered with nicotine which requires temperatures above 75° F. to be really effective. Again in contrast to nicotine the oil-thiocyanate sprays have the advantage of not requiring a quiet atmosphere with little or no air movement to be effective. They are not so critical as to weather and atmospheric conditions as oils alone. The oil-thiocyanate combination is more effective against "difficult" insects and is a stronger contact spray than other previously used sprays and one with greater safety and effectiveness against more types of pests. Compared to derris the thiocyanate mixtures act more rapidly and thoroughly and permit reduction in the quantity of oil used. The surface-active properties of the thiocyanates improve the application properties of the oil sprays to an optimum degree. Careful experimentation over a period of years has shown the proper application of oil-thiocyanate combinations to be safe and effective.

I claim:

1. An aqueous spray for application to plants which comprises between about 0.5% to about 1% of a spray oil, about 0.025% to about 0.125% of a β-thiocyanoethyl ester of a higher fatty acid, about 0.025% to about 0.25% of a blending agent, and about 0.025% to about 0.125% of an emulsifying agent.

2. An aqueous spray for application to plants which comprises between about 0.5% to about 1% of a petroleum oil having a viscosity of about 60 to about 100 seconds (Saybolt) at 100° F. and an unsulfonatable residue of at least 60%, about 0.025% to about 0.125% of the β-thiocyanoethyl ester of cocoanut oil fatty acids, about 0.025% to about 0.25% of pine oil, and about 0.025% to about 0.125% of an emulsifying agent.

3. An aqueous spray for application to living plants which contains a spray oil in an amount between about 0.5% and about 1%, butoxyethoxyethyl thiocyanate in an amount between about 0.025% and about 0.125%, a blending agent in an amount between 0.025% and about 0.25%, and an emulsifying agent in an amount between about 0.025% and about 0.125%.

4. An aqueous spray for application to living plants which comprises between about 0.5% to 1% of a petroleum oil having a viscosity between 60 and about 100 seconds (Saybolt) at 100° F. and an unsulfonatable residue of at least 60%, about 0.025% to about 0.125% of butoxyethoxyethyl thiocyanate, about 0.025% to about 0.25% of a blending agent, and about 0.025% to 0.125% of an oil-soluble emulsifying agent.

5. A spray for application to living plants which contains a spray oil in an amount less than about 2%, butoxyethoxyethyl thiocyanate in an amount less than 0.25%, an emulsifying agent, and water.

6. An aqueous spray for application to living plants which contains 0.5% to 2% of a spray oil, 0.01% to 0.25% of butoxyethoxyethyl thiocyanate, 0.01% to 0.25% of an emulsifying agent compatible with the oil, and 0.1% to 0.25% of a blending agent.

7. An aqueous spray for application to living plants which contains 0.5% to 2% of a petroleum oil having a viscosity between about 60 seconds and 100 seconds (Saybolt) at 100° F., 0.01% to 0.25% of butoxyethoxyethyl thiocyanate, 0.01% to 0.25% of an emulsifying agent, and 0.1% to 0.25% of a blending agent.

8. An aqueous spray for application to living plants which contains 0.5% to 2% of a spray oil, 0.01% to 0.25% of an emulsifying agent, 0.1% to 0.25% of a blending agent, and 0.01% to 0.25% of a thiocyano substituted ethyl ether.

9. An aqueous spray for application to living plants which contains 0.5% to 2% of a petroleum oil having a viscosity between about 60 seconds and 100 seconds (Saybolt) at 100° F., 0.01% to 0.25% of a thiocyano ethyl ester of a higher fatty acid, 0.01% to 0.25% of an emulsifying agent, and 0.1% to 0.25% of a blending agent.

10. An aqueous spray for application to living plants which contains 0.5% to 2% of a spray oil, 0.01% to 0.25% of an emulsifying agent, and 0.01% to 0.25% of a thiocyano ethyl ester of a higher fatty acid.

11. An aqueous spray for application to living plants which contains 0.5% to 2% of a spray oil, 0.01% to 0.25% of an emulsifying agent, 0.1% to 0.25% of a blending agent, and 0.01% to 0.25% of an organic thiocyanate selected from the group consisting of thiocyano substituted ethyl ethers and thiocyano ethyl esters of higher fatty acids.

12. A spray for application to living plants which contains water, an emulsifying agent, less than about 2% of a spray oil, and less than 0.25% of an organic thiocyanate selected from the group consisting of thiocyano substituted ethyl ethers and thiocyano ethyl esters of higher fatty acids.

DONALD F. MURPHY.